Patented May 28, 1935

2,003,234

UNITED STATES PATENT OFFICE 2,003,234

PRODUCING HIGH VISCOSITY INDEX OILS

Harry T. Bennett, Tulsa, Okla., assignor to Mid-Continent Petroleum Corporation, Tulsa, Okla., a corporation of Delaware No Drawing. Application April 21, 1932, Serial No. 606,764

10 Claims. (Cl. 196—13)

This invention relates to processes of producing high vicosity index oils. The invention herein disclosed is more broadly claimed in an application filed by me on March 2, 1931, Serial Number 519,698, and the present application is a continuation in part of said application, Serial Number 519,698.

Specifically stated this invention relates to a process of treating oils having high and low viscosity index constituents with a selective solvent to effect a separation of the oil into fractions having a high viscosity index and a low viscosity index.

The viscosity index of an oil is a number indicating the extent to which its viscosity will change when the temperature is increased from 100° F. to 210° F. The viscosity of an oil having a low viscosity index will change very greatly in response to a change in temperature, while an oil having a high viscosity index will withstand such variations in temperature without the same degree of change in its viscosity.

Prior to my invention in this art, attempts have been made to increase the viscosity index of an oil by treating the oil with a solvent to remove the low viscosity index constituents. However, in so far as I am aware these attempts have not resulted in a satisfactory and economical solution of this problem.

It has heretofore been extremely difficult to remove all of the solvent from the treated oil without discoloring the oil and producing an excessive loss of the solvent.

One of the objects of this invention, therefore, is to provide a simple and effective process for recovering the solvent from the fractions of the oil.

Another object of this invention is to provide a process for breaking any emulsions formed in the solvent during the recovery of the solvent from said fractions.

With the foregoing and other objects in view, the invention comprises the novel method hereinafter specifically described to point out details of one form of the invention. However, it is to be understood that the invention comprehends changes, variations, and modifications which come within the scope of the claims hereunto appended.

In the preferred form of this invention, I treat an oil having a relatively low viscosity index with a solvent which has a selective action for the constituents of low viscosity index. The resultant solutions is permitted to settle, and the solvent containing the dissolved low viscosity constituents settles to the bottom where it can be readily discharged from the container and thus separated from the constituents having a high viscosity index.

The fractions containing the high and low viscosity index constituents may then be separately distilled under a pressure less than atmospheric presure to recover a substantial quantity of the solvent from said fractions, and the last traces of solvent remaining in the fractions may be recovered by treating them with steam or an inert gas.

By recovering a large percentage of the solvent under a pressure less than atmospheric pressure and removing the last traces of solvent with steam or an inert gas, the solvent can be recovered at a low temperature, the possibility of decomposition of the solvent is reduced to a minimum and consequently the corrosion of equipment due to decomposition products is likewise reduced, and the color of the oil is not substantially affected.

I have also found that it is preferable to introduce a neutralizing agent, such as ammonia, into the still during the distilling operation to neutralize the products of decomposition, and to reduce corrosion of the still. An advantage of introducing ammonia into the still lies in the neutralization it affords not only in the still itself, but also in the distilled vapors, as a portion of the ammonia gas will flow to the condenser, where it is condensed with the solvent.

When steam is used to remove the solvent from oils an emulsion is frequently formed in the recovered solvent by the condensation of the steam. This emulsion may be destroyed and the water separated from the solvent by filtering the emulsified solvent through finely divided material, such as sand, fuller's earth, etc. The emulsion may also be destroyed by centrifuging the emulsified solvent. However, I prefer to destroy the emulsion by filtering the emulsified solvent through a finely divided material as this process is extremely simple and highly effective.

As a specific illustration of one form of this invention, I will hereafter describe how a mid-continent lubricating oil having a Saybolt universal viscosity of 47 at 210° F. and a viscosity index of 77.1 was treated in accordance with this invention.

A mixture of four parts dichlorethyl ether and one part of said lubricating oil was agitated at a temperature of about 80° F. to dissolve the low viscosity constituents of the oil in the dichlorethyl ether. The oil and solvent were then allowed to settle into layers. The lower layer or fraction containing the dissolved low viscosity index constituents was separated from the upper layer or fraction containing the high viscosity index constituents.

These fractions were then separately distilled at a temperature of about 280° F. and at a pressure of approximately 100 mm. to recover a substantial quantity of the dichlorethyl ether. The remaining dichlorethyl ether was then recovered at a temperature of 333° F. while introducing live steam.

During the foregoing distilling operations ammonia was introduced into the still in a quantity sufficient to neutralize any decomposition products and to reduce corrosion to the still.

The emulsified dichlorethyl ether which was recovered during the steam distillation was filtered through a column of fuller's earth to separate the water from the dichlorethyl ether and thus break up the emulsion which was formed in the dichlorethyl ether by the condensation of steam.

After the dichlorethyl ether was removed from the fraction containing the high viscosity index constituents, the remaining oil which was about 61 percent of the originally low viscosity oil had a high viscosity index of 98.5.

It is obvious that the processes disclosed in the foregoing specific example of this invention may be carried out with any solvent having a suitable selective action for either the high or low viscosity index constituents of the oil, and the other steps may be varied with different oils and solvents. It is, therefore, not my intention to limit this invention to the specific illustrations herein described.

I claim:

1. The method of treating oils having high and low viscosity index constituents which comprises treating an oil with dichlorethyl ether to effect a separation of the oil into fractions having a high viscosity index and a low viscosity index, and separately distilling said fractions under a pressure less than atmospheric pressure and treating said fractions with steam to recover the dichlorethyl ether from said fractions, and filtering said dichlorethyl ether through a column of fuller's earth to remove the water formed in the dichlorethyl ether by the condensation of the steam.

2. In the art of making high viscosity index lubricating oils, the process of treating oils having high and low viscosity index constituents, which comprises mixing dichlorethyl ether with the oil to be treated, separating the mixture into an oil fraction having a higher viscosity index than that of the original oil, and a dichlorethyl ether fraction, and distilling the dichlorethyl ether from one of said fractions in the presence of a neutralizing agent to neutralize the products of decomposition.

3. In the art of making high viscosity index lubricating oils, the process of treating oils having high and low viscosity index constituents, which comprises mixing dichlorethyl ether with the oil to be treated, separating the mixture into an oil fraction having a higher viscosity index than that of the original oil, and a dichlorethyl ether fraction, and distilling one of said fractions in the presence of ammonia to recover dichlorethyl ether from the oil.

4. In the art of making high viscosity index lubricating oils, the process of treating oils having high and low viscosity index constituents, which comprises mixing dichlorethyl ether with the oil to be treated, separating the mixture into a fraction having a higher viscosity index than that of the original oil, and a fraction having a lower viscosity index, separately treating one of said fractions with steam to recover the dichlorethyl ether from the oil, and removing the water formed in the dichlorethyl ether by the condensation of steam.

5. In the art of making high viscosity index lubricating oils, the process of treating oils having high and low viscosity index constituents, which comprises mixing dichlorethyl ether with the oil to be treated, separating the mixture into an oil fraction having a higher viscosity index than that of the original oil, and a dichlorethyl ether fraction, separately treating one of said fractions with steam to recover the dichlorethyl ether from the oil, and filtering said dichlorethyl ether through a mass of finely divided material to break the emulsions formed therein by the condensation of the steam.

6. In the art of making high viscosity index lubricating oils, the process of treating oils having high and low viscosity index constituents, which comprises mixing dichlorethyl ether with the oil to be treated, separating the mixture into an oil fraction having a higher viscosity index than that of the original oil, and a dichlorethyl ether fraction, separately distilling one of said fractions with steam to recover dichlorethyl ether from the fraction, and filtering the recovered dichlorethyl ether through fuller's earth to break the emulsions formed therein by the condensation of the steam.

7. The method of refining petroleum oils with chlorinated solvents which comprises mixing said oil with a selective chlorinated solvent of the type used in petroleum oil refining, regulating the temperature to effect a separation of a liquid oil phase containing dissolved solvent from a liquid solvent phase containing dissolved oil, removing one liquid phase from the other liquid phase and separately distilling the solvent from the oil in each phase in the presence of an alkaline neutralizing agent whereby catalytic decomposition of the chlorinated solvent is prevented.

8. The method of claim 7 wherein the neutralizing agent is ammonia.

9. The process of treating oils having different constituents which comprises treating the oil with a chlorinated ether to effect a separation of the oil into fractions, separately distilling said fractions with steam to recover chlorinated ether from said fractions, condensing said steam, and recovering the chlorinated ether from said condensed steam.

10. The process of treating oils having high and low viscosity index constituents which comprises treating an oil with dichlorethyl ether to effect a separation of the oil into fractions having a higher viscosity index and a lower viscosity index than the original oil, separately distilling said fractions and treating them with steam to recover dichlorethyl ether from said fractions, condensing said steam, and separating substantially all of said dichlorethyl ether from said condensed steam.

HARRY T. BENNETT.